United States Patent [19]

Bloch

[11] 3,873,140

[45] Mar. 25, 1975

[54] FISH HOOK HOLDER AND KNOT TYING DEVICE

[75] Inventor: Paul P. Bloch, Moodus, Conn.

[73] Assignee: Moodus Sports Products, East Haddam, Conn.

[22] Filed: Oct. 15, 1973

[21] Appl. No.: 406,536

[52] U.S. Cl. ............................................. 289/17
[51] Int. Cl. ............................................. D03j 3/00
[58] Field of Search ................................. 289/17

[56] References Cited
UNITED STATES PATENTS

| | | |
|---|---|---|
| 2,926,036 | 2/1960 | Wimberley............................ 289/17 |
| 3,086,802 | 4/1963 | Keeton................................. 289/17 |
| 3,357,086 | 12/1967 | Hood.................................... 29/241 |
| 3,694,014 | 9/1972 | Rossbach et al...................... 289/17 |

Primary Examiner—Louis K. Rimrodt

[57] ABSTRACT

A fish hook holder and knot tying device is presented having a main barrel, a removable end cap to which is fastened a needle housed in a recess in the barrel, a spring clip hook holder aligned with a threading funnel through the barrel, and three tying fingers extending from one end of the barrel.

10 Claims, 15 Drawing Figures

3,873,140

3,873,140

FISH HOOK HOLDER AND KNOT TYING DEVICE

BACKGROUND OF THE INVENTION

Although not necessarily limited to the field of fishing, the device of the present invention is particularly useful for tying fishing knots and affixing a fishing hook to a line. Tying hooks to fishing lines and tying the several relatively complicated knots used in joining a leader to a line or tippet is a relatively tedious job and often requires somewhat nimble or agile fingers. Many fishermen find this difficult or awkward to do, and a multi-purpose tool would be a welcomed aid.

Proposals have been made in the past for tools of various types for knot tying devices, and fish hook threader devices have also been proposed. However, the range of uses and capabilities of these devices has been somewhat limited.

SUMMARY OF THE INVENTION

The fish hook threader and knot tying device of the present invention is a tool which combines the capability of hook threading and the capability of tying a variety of relatively complicated knots commonly used in meeting various fishing requirements. The tool of the present invention is a relatively compact device having the generally elongated shape of a mechanical pencil or pen, and it has a fastening clip so that it can be carried simply by clipping to a pocket in the form of a mechanical pencil or pen.

The tool of the present invention has a main body or barrel portion from which a plurality of tying fingers extend. The fingers are slightly relatively displaceable and resilient so as to allow the insertion and holding of lines therebetween. A funnel shap opening through the barrel cooperates with a spring loaded device for holding the eyelet of a fish hook in proper alignment to receive a line, and the body also has a central recess for housing a puncturing needle attached to one end of a removable end cap. The puncturing needle can be extracted from the barrel when needed for such purposes as forming holes in lines or cleaning the eye of a hook. The normally exposed end of the end cap also has a slot for holding the eye end of a barbed eyelet when securing the barbed eyelet to a line.

BRIEF DESCRIPTION OF THE DRAWING:

Referring now to the drawings, wherein like elements are numbered alike in the several figures.

Figure 1:
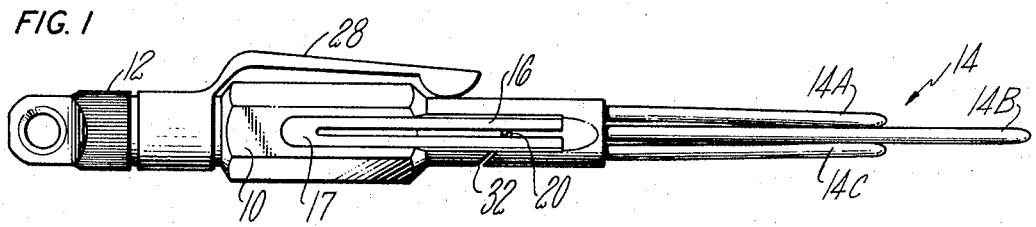
FIG. 1 is a side elevation view of the fish hook threader and knot tying device of the present invention.
Figure 2:
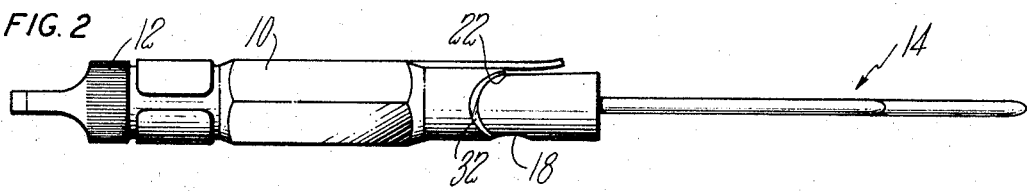
FIG. 2 is a view of the device in FIG. 1 rotated 90° counterclockwise.
Figure 3:
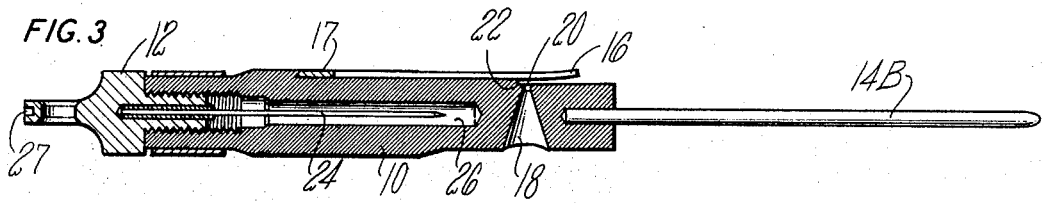
FIG. 3 is a cross-sectional view of the device in the position of FIG. 2 but with the clip and end cap rotated for purposes of illustration.

DESCRIPTION OF THE PREFERRED EMBODIMENT:

Referring now to a combined view of FIGS. 1, 2 and 3, the device is in the overall elongated shape of a mechanical pencil or pen having a main body 10, a removable end cap 12 at one end of the body and a set 14 of three tying fingers, 14A, 14B and 14C affixed to and projecting from the other end of barrel 10. End cap 12 may be screw threaded or friction fitted into an appropriately shaped recess in the end of barrel 10. Fingers 14A and 14C are of approximately equal length and straddle central finger 14B which extends beyond the other two fingers. The fingers are slightly flexible or springy. Fingers 14A and 14C are slightly spaced from finger 14B at barrel 10, and they are inclined toward finger 14B so that fingers 14A and 14C abut finger 14B from approximately their midpoints to the ends of fingers 14A and 14C so that the lines to be tied can be slid between and engaged between pairs of adjacent fingers with some tension. A fish hook holder 16 in the form of a pair of spaced apart spring fingers are attached to barrel 10 at end 17 and extend along the barrel toward fingers 14. A conical passageway 18 extends through the body of barrel 10 and necks down to an orifice 20 which is aligned with the spacing between the fingers of fish hook holder 16. The body of barrel 10 is recessed in the vicinity of orifice 20 to form a recessed back stop or shoulder 22 to receive the eyelet of a fly fed through cone 18 and orifice 20.

As can best be seen in FIG. 3, removable end cap 12 has a needle 24 attached thereto which is housed in a central recess 26 in the barrel; and the end of cap 12 removed from needle 24 also has an end slot 27. A spring clip 28 is also mounted on the device near end cap 12 so that the device can be clipped to a pocket or other suitable location for carrying purposes.

Figure 4A:
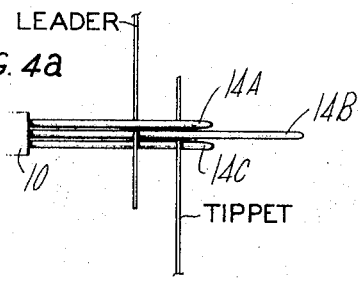
FIGS. 4a—4d are a series of views showing a blood or barrel knot being tied with the device of the present invention.
Figure 4B:
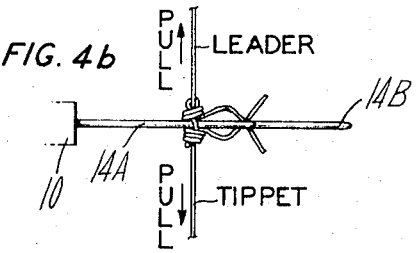
Figure 4C:
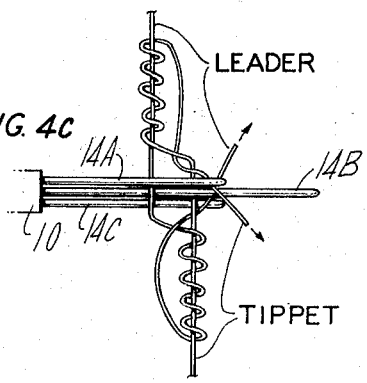
Figure 4D:
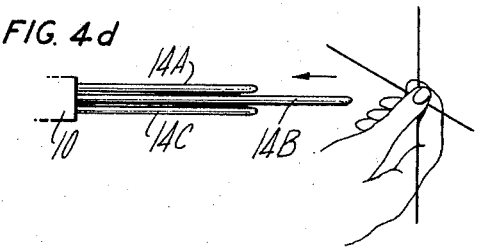

Referrring now to FIGS. 4a—4d, the device of the present invention is shown as used in the tying of a blood or barrel knot which is generally used for attaching a tippet to a leader or tying two monofilament lines together. Only the right hand end of barrel 10 and the fingers 14A, 14B and 14C are shown in FIG. 4. In tying the blood or barrel knot, the tippet is placed between fingers 14B and 14C at approximately three-eighths of an inch from the end of finger 14C with approximately 4 inches of the tippet extending to the left beyond finger 14A. The leader is placed between fingers 14A and 14B approximately one-fourth inch below the tippet and with the right end of the leader extending approximately 4 inches to the right of finger 14C. This configuration is shown in FIG. 4a. As has been indicated above, and as is true in all of the blood or barrel knot tying examples, the fingers grasp and hold the lines which are inserted between them, thus allowing the user of the device to have relatively free movement of his hands and fingers for accomplishing the rest of the knot tying technique. Referring now to FIG. 4b, the leader is wound around the tippet three or four turns and then brought back and laced through the opening between the leader and tippet and secured between the end of finger 14C and finger 14B. Similarly, the tippet is wound around the leader approximately four turns and then brought back and laced through the opening between a tippet and the leader and secured between the end of finger 14A and finger 14B. Now referring to FIG. 4c, the tippet and the leader are both pulled firmly, thus closing the knot around the fingers 14 (which are shown in FIG. 4c in a side view). Referring now to FIG. 4d, the knot is then grasped between the thumb and forefinger and the tool is pulled downward to disengage the tool from the knot. While still holding the knot between the thumb and forefinger the tippet, leader and short ends of each are pulled gently but firmly so as to firmly set the knot. The short ends are then trimmed to complete the knot.

Figure 5A:
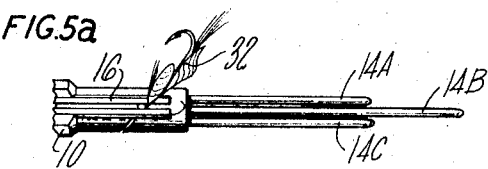
FIGS. 5a—5c show the device of the present invention being used for fly threading and clinch knot tying.
Figure 5B:
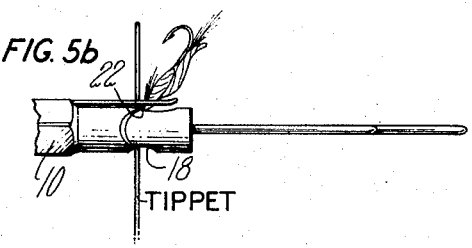
Figure 5C:
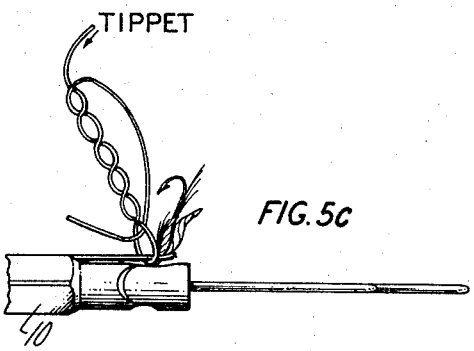

Referring now to FIGS. 5a–5c, a fly threading and clinch knot tying operation is shown. In this operation, referring first to FIG. 5a, a fly is mounted on the device by sliding the eye of the fly under the projecting ends of the fingers of holder 16 in the recess between the fingers and barrel 10 so that the eye is urged against shoulder 22. The opening of the eye is thus aligned with orifice 20. Referring to FIG. 5b, the tippet is then threaded through cone shaped passageway 18 and the tippet is guided directly through the central opening in the eye of the fly. At this point in the procedure the fly is now threaded and can be removed if desired. Removal is accomplished by passing the tippet through an inclined lateral slot 32 which extends from conical passageway 18 through barrel 10 on one side. Slot 32 can best be seen in FIGS. 1 and 2. Referring now to FIG. 5c, to complete the clinch knot operation, enough of the tippet line is drawn through so as to be able to hold a doubled portion of the tippet between the thumb and index finger at point A. Holding the doubled tippet at point A, the tool is then rotated five or six turns, and the end of the tippet is then laced through the loop at the holder 16 (the tippet having previously been slipped through slot 32). The free end of the tippet is then pressed against the barrel body at point B and the knot is drawn snug but not tight. The fly with the knot thus tied is then removed from the device by sliding it from under the fingers of holder 16. The knot is then finished by drawing it tight and trimming the ends.

Figure 6A:
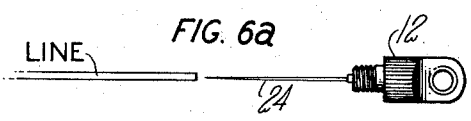
FIGS. 6a and 6b show the device being used in the installation of an eyelet.
Figure 6B:
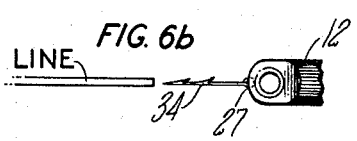

Referring now to FIGS. 6a and 6b, the device of the present invention is shown as used in installing an eyelet. End cap 12 is removed to withdraw needle 24 from recess 26. Needle 24 is then used to puncture the end of a fly line by inserting the needle into the center of the fly line approximately one-half inch deep along the axis of the line. A barbed eyelet 34 is then inserted in the entrance of the hole made by the needle, and cap 12 is then positioned so that the eye of the barbed eyelet is engaged by end slot 27, the end cap having been previously remounted in the closed position on the end of barrel 10. A pushing and twisting motion is then used to complete insertion of the barbed part of the eyelet into the line to the full depth of the eyelet, thus firmly engaging the eyelet in the line.

Figure 7A:
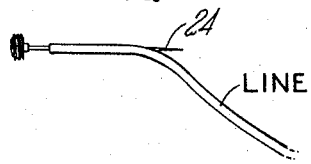
FIGS. 7a—7c show the device of the present invention being used in the tying of a needle knot.
Figure 7B:
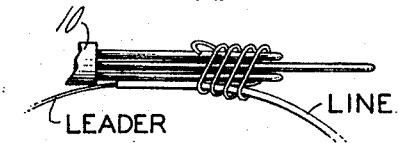
Figure 7C:

Referring now to FIGS. 7a through 7c, the device of the present invention is shown as used in the tying of a needle knot. As first shown in 7a, needle 24 is used to pierce the end of a fly line by entering at one end of the fly line and coming out through a midpoint in the fly line at approximately one-half inch from the end. Referring now to FIG. 7b, the butt end of a leader is cut on an angle and pushed through the hole previously made in the line by the needle. The line is then laid along the tool so that the end of the line is aligned with the plane passing through all three tying fingers, and three or four turns of the leader are looped around the line and the tying fingers as shown in 7b. The leader butt is then laced back through the turns, via the channel created by pressure of loops around the tying fingers, and the knot is loosely grapsed at point D with the thumb and index finger and drawn snug. Referring to FIG. 7c, while still loosely grasping the knot between the thumb and forefinger as described, the knot is slid off the tying fingers and the ends drawn tight.

The device of the present invention can be used for tying other types of fishing knots in addition to those examples set forth herein.

while a preferred embodiment and uses thereof have been shown and described, various modifications and substitutions may be made thereto and other uses made thereof without departing from the spirit and scope of the invention. Accordingly, it is to be understood that the present invention has been described by way of illustration and not limitation.

What is claimed is:

1. A fish hook threader and knot tying device including:
   an elongated body portion having first and second ends;
   a plurality of tying fingers extending from a first end of said body portion, said fingers being in substantially a common plane with at least one of said fingers being resiliently spring biased against another finger to from a pair of fingers cooperating to hold therebetween a line to be tied;
   a recessed portion on said body defining a shoulder transverse to the body;
   a conical passageway through said body portion, said conical passageway communicating with said recessed portion to form an entranceway to said recessed portion spaced from said shoulder;
   a pair of spaced apart resilient fingers extending over said recessed portion, the spacing between said fingers being aligned with said entranceway; and
   a transverse slot through said body to said conical passageway.

2. A fish hook threader and knot tying device as in claim 1 including:
   a removable end cap at the second end of said body;
   a recess in said body at said second end;
   a needle extending from one part of said end cap, said needle normally being housed in said body recess; and
   a slot in said end cap, said slot being in a part opposite to said needle and being exposed when said needle is housed in said body recess.

3. A fish hook threader and knot tying device as in claim 1 wherein said tying fingers includes:
   an elongated central finger and a pair of side fingers, each of the side fingers being shorter than said central fingers.

4. A fish hook threader and knot tying device as in claim 3 wherein:
   said fingers are free to move relative to each other along at least a portion of their lengths removed from said body.

5. A fish hook threader and knot tying device as in claim 3 wherein:
   each of said side fingers is spaced from said central finger at said first end of said body portion and is inclined toward said middle finger, each of said side fingers abutting said middle finger from about the midpoint to the ends of each side finger.

6. A knot tying device including:
   an elongated body portion;

a first tying finger extending from said body portion;

second and third tying fingers extending from said body portion on opposite sides of said first tying finger, said second and third tying fingers being shorter than said first tying finger;

said first, second and third tying fingers being aligned in substantially a common plane; and each of said second and third fingers being resiliently spring loaded against said first finger to hold a line to be tied between said first finger and at least one of said second and third fingers.

7. A knot tying device as in claim 6 including:

a removable end cap on said body at one end thereof;

a recess in said body at said one end;

a needle extending from said end cap, said needle normally being housed in said recess; and a slot in said end cap for engaging the end of an eyelet to be set in a line, said slot being exposed when said needle is housed in said recess.

8. A knot tying device as in claim 6 wherein:

each of said second and third fingers is spaced from said first finger at said body portion and is inclined toward said first finger, each of said second and third fingers resiliently abutting said first finger from approximately the midpoint of each of said second and third fingers.

9. A fish hook threader including:

an elongated body having first and second ends;

a recessed portion on said body between said first and second ends, said recessed portion defining a shoulder generally transverse to the axis of the body;

a pair of spaced apart resilient fingers extending longitudinally along said body over said shoulder and recessed portion for holding a fish hook to be threaded against said shoudler;

a conical passageway through said body for feeding line to be threaded to a fish hook, said conical passagesay being aligned with the spacing between said fingers; and a transverse slot in said body, said slot communicating with said conical passageway to remove the line after threading to a fish hook.

10. A knot tying device as in claim 9 including:

a removable end cap on said body at one end thereof;

a recess in said body at said one end;

a needle extending from said end cap, said needle normally being housed in said recess; and a slot in said end cap for engaging the end of an eyelet to be set in a line, said slot being exposed when said needle is housed in said recess.

* * * * *